(12) United States Patent
Aher et al.

(10) Patent No.: US 12,170,085 B2
(45) Date of Patent: Dec. 17, 2024

(54) INCREASING USER ENGAGEMENT THROUGH QUERY SUGGESTION

(71) Applicant: Adeia Guides Inc., San Jose, CA (US)

(72) Inventors: Ankur Anil Aher, Maharashtra (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 653 days.

(21) Appl. No.: 17/381,908

(22) Filed: Jul. 21, 2021

(65) Prior Publication Data

US 2023/0022515 A1    Jan. 26, 2023

(51) Int. Cl.

| | | |
|---|---|---|
| *G10L 15/00* | (2013.01) | |
| *G06F 16/33* | (2019.01) | |
| *G10L 15/02* | (2006.01) | |
| *G10L 15/22* | (2006.01) | |

(52) U.S. Cl.
CPC .......... *G10L 15/22* (2013.01); *G06F 16/3343* (2019.01); *G10L 15/02* (2013.01); *G10L 2015/025* (2013.01); *G10L 2015/223* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/10; G10L 15/14; G10L 15/197; G10L 15/1815; G10L 15/1822; G10L 15/183; G10L 15/19; G10L 15/193; G10L 25/78; G10L 25/87; G10L 21/0208; G10L 15/187; G10L 2015/0631
See application file for complete search history.

(56) References Cited

U.S. PATENT DOCUMENTS 11,024,297 B2 * 6/2021 Aravamudan ...... G10L 15/1822
2021/0034661 A1   2/2021 Pande et al.

* cited by examiner

*Primary Examiner* — Vu B Hang
(74) *Attorney, Agent, or Firm* — Haley Guiliano LLP

(57) ABSTRACT

Systems and methods are presented herein for increasing user engagement with an interface by suggesting commands or queries for the user. A plurality of content items available for consumption are identified and metadata for each of the plurality of content items is retrieved. One or more candidate voice commands are generated based on a plurality of voice command templates based on a target verb and a subset of the metadata corresponding to the plurality of the content items available for consumption. A recall score is generated for each candidate voice command based at least in part on a detection of phonetic features that match between clauses of each candidate voice command. At least the candidate voice command with the highest recall score is selected and output using a suggestion system.

20 Claims, 8 Drawing Sheets

INCREASING USER ENGAGEMENT THROUGH QUERY SUGGESTION

BACKGROUND

The present disclosure is directed to systems and methods for suggesting inputs and, more particularly, to systems and methods that suggest commands and queries that may be utilized while interacting with an interface based on a likelihood the suggested commands and queries will be input in the future.

SUMMARY

In some approaches to voice-based command processing, an application that is capable of processing voice-based commands or queries requires the inputs received to be formatted based on a structure that enables machine processing of the command or query. These structures require additional human processing as they are intended to simplify the machine processing and are not formatted for ease of human processing or retention. For example, some approaches may require a command or query to include a wake command followed by a specifically structured clause in order to process a voice-based input (e.g., a verb corresponding to a known action for the application to take, such as "Find," followed by a set of criteria to limit a search performed by the application, such as "action movies"). This approach is deficient in that the system may receive commands that cannot be processed by the system, and the system may require follow-up commands and/or follow up inputs to perform a task (e.g., a text input clarifying a request or a subsequent voice input comprising instructions formatted in a manner the system requires).

In another approach, commands or queries may be suggested for a user to utilize. However, the rate of suggestion is contingent on the ability of a suggestion engine to correlate a user's activity to a known command or query structure. As a result, the rate of suggestion of commands or queries does not result in an increase in user engagement or user retention of commands. For example, an application may require that a user's activity history correlates a command to a specific category of content items (e.g., require a user search at a specific rate, such as daily, for a specific genre, such as "action," and a specific content type, such as "movies"). This approach is also deficient in that it requires a specific format of inputs in order for the system to process commands and fails to factor in a particular user's retention strengths or preferences in order to increase user engagement with the interface that utilizes voice-based command or query processing. Current approaches instead rely on suggested commands that may appear unnatural as they may be formatted for machine processing instead of for natural use by a user. As a result, the unnatural suggested commands are often ignored or not used.

Systems and methods described herein are for suggesting commands and queries that can be utilized while interacting with a platform interface. In one aspect of the present disclosure, a query suggestion application is configured to execute a method for suggesting voice-based queries to a user. The query suggestion application identifies a plurality of content items available for consumption by the user. Additionally, the query suggestion application retrieves metadata for each of the plurality of content items. Based on a plurality of voice command templates, the query suggestion application generates a set of and/or one or more candidate voice commands. Each candidate voice command comprises either a verb, which may be identified from a query a user began to provide, or one of a plurality of verbs associated with the verb, at least one phonetic feature, and a subset of metadata corresponding to a content item of the plurality of content items. In some embodiments, the candidate voice commands are not based on a verb provided as part of a draft query and instead may be based on recent user activity. For example, if a user recently provided a query utilizing "Search for" and the query suggestion application determines the same user is active and browsing currently for content, the query suggestion application may generate candidate voice commands considering the previously entered query involving the word "find." The query suggestion application may utilize an intent analyzer to identify synonyms for the word "find" or identify verbs that result in similar commands being executed by a system in order to suggest or teach new commands. The word "find" may be correlated to command templates such as "Play at <TIME-SLOT> news on <GENRE>" as the example command template correlates to a command for finding content of a particular genre during a particular time slot.

The query suggestion application generates for each candidate voice command a respective recall score based at least in part on a number of times a phonetic feature is repeated in a respective candidate voice command. A candidate voice command with the highest recall score is selected by the query suggestion application from the set of and/or one or more candidate voice commands. Once the candidate voice command is selected by the query suggestion application, the candidate voice command is output by the query suggestion application for a user to perceive. For example, the candidate voice command may be generated for display on user equipment, may be audibly output as a recommended query, or may be a combination of both an audio and visual output for a user to perceive.

The techniques of the present disclosure solve the problems of other approaches described above. In particular, these techniques utilize a plurality of voice command templates structured to correlate a user's preferred commands to a user's preferred set of and/or one or more activities. Additionally, the templates are adapted and updated based on a data correlating a user's utilization of previously suggested commands or queries to a user's retention of a format of suggested commands or queries. Thus, the approaches described in the disclosure enable a query suggestion application to suggest commands or queries to a user that are structured to increase user engagement with the interface supported by the content platform and improve user retention of suggested commands or queries. By utilizing the described inputs for generating suggestions, the techniques of this disclosure create memorable suggestions based on a phonetic analysis of suggestions generated based on a database of available content and corresponding user activity data.

In some embodiments, the query suggestion application identifies the plurality of content items available for consumption by the user based at least in part on a user profile associated with the interface correlated to the content platform. For example, a database may be utilized to store user profile activity. The query suggestion application may retrieve from the database user profile activity data and determine, based on the user profile activity data, a plurality of content items to recommend to the user (e.g., based on past views, past likes, and/or current viewing progress of content items available from the content platform through the interface). In some embodiments, the user profile activity data comprises at least one of a watch history associated with the user profile, purchases associated with the user profile, and/or ratings of content items available through an interface accessible by the user profile.

In some embodiments, the metadata for each of the plurality of content items comprises descriptive attributes of each of the plurality of content items. For example, the metadata may comprise at least one of a title, a content source, a streaming or a broadcast time slot, and/or a genre. In some embodiments, the metadata may be embedded by a server or database where the content item is stored for access by a particular content platform. In some embodiments, a platform may access content items from other platforms that embed or encode descriptive metadata of their own. In some embodiments, a current platform may utilize the metadata provided with the content item, or the current platform may create a unique set of and/or one or more metadata for the purposes of enabling the query suggestion application to access or recognize descriptive metadata associated with each content item.

In some embodiments, the query suggestion application may retrieve a plurality of voice command templates from memory. Each of the plurality of voice command templates may comprise a respective set of and/or one or more metadata types required to complete each of the plurality of voice command templates. The query suggestion application may determine a respective metadata type for the retrieved metadata for each of the plurality of content items. The query suggestion application may compare each respective set of and/or one or more metadata types to each of the other respective metadata types of the retrieved metadata and determine, based on the comparing, which of the plurality of voice command templates can be completed using the retrieved metadata. The query suggestion application may identify a subset of metadata corresponding to the content item of the plurality of content items that may be used to generate a recommended command or query for a user to perceive. In some embodiments, the respective metadata types required to complete each of the plurality of voice command templates and the respective metadata types for the retrieved metadata each comprise at least one of a content item title, a content item source, a streaming or broadcast time slot for a content item, and a content item genre. In some embodiments, if the query suggestion application determines that none of the plurality of voice command templates can be completed using the retrieved metadata, the query suggestion application may retrieve a plurality of new content items to recommend to the user.

In some embodiments, the query suggestion application may be configured to utilize voice command templates that comprise phonetic features such as a prefix, a suffix, an equal number of syllables between terms, and/or a phonetic rhyme. In some embodiments, the phonetic rhyme utilized in the voice command template may comprise an imperfect rhyme, a chain rhyme, a compound rhyme, and/or a bridge rhyme. In some embodiments, the phonetic rhyme is used by the query suggestion application to determine a respective contributing weight to apply to the respective recall score for each candidate voice command. The respective recall score may be updated based on the respective contributing weight of the phonetic rhyme. The contributing weight of the phonetic rhyme may be adjusted based on a user's activity history as it pertains to using and recalling recommended commands or queries.

In some embodiments, the recall score is higher when a rhyme between a first phoneme and a second phoneme is paired with matching rhythms between a first phonetic feature and a second phonetic feature (e.g., "Help me find Megamind" may be scored higher than "Find me Megamind"). The recall score may be higher where a single candidate voice command has a first set of and/or one or more phonetic features for a first clause matches a second set of and/or one or more phonetic features for a second clause, which may be a dependent clause of the first clause. Phonetic features that result in rhymes between clauses, matching cadences between clauses, and matching perceived sounds may be utilized by the query suggestion application when detected in a candidate voice query to increase the recall score. Conversely, candidate voice queries without these matches will not have recall scores generated that are as high, as they do not incorporate phonetic features that are perceived as increasing either user engagement or user recall of a command.

In some embodiments, the recall score is calculated by applying a weight to each phonetic feature detected in each clause. For example, a first clause may include a vowel-based phonetic feature. The second clause may include the same vowel-based phonetic feature. Considering the first and second features utilize a same phonetic feature, a rhyme may be detected between the first clause and the second clause. If it is determined that a user associated with the user profile readily utilizes rhyming candidate commands and repeats their use, a rhyme may be given a larger contributing weight, as opposed to another phonetic feature such as a rhythmic match based on a same number of phonemes that do not rhyme between the first and second clauses. In some embodiments, the contributing weight is based on a stored value taken from memory assigned to each type of phonetic feature. In some embodiments, the contributing weight is adjusted in memory based on the ability of a user to recall a recommended command that has particular phonetic features (e.g., a record is kept of a user's utterance of suggested queries and contribution weights are adjusted based on the user's use of suggested queries).

In some embodiments, the query suggestion application generates suggested commands based on data corresponding to existing and/or recently accessed content items to create memorable suggestions. A database corresponding to available content items may be referenced against a user activity log to identify content items of interest. The query suggestion application may utilize data from content items available and related to recent activity to reinforce the suggested commands to improve a user's ability to recall a suggestion.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Methods and systems are provided herein for suggesting commands and queries for a user to utilize while interacting with a platform interface. The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

Figure 1:
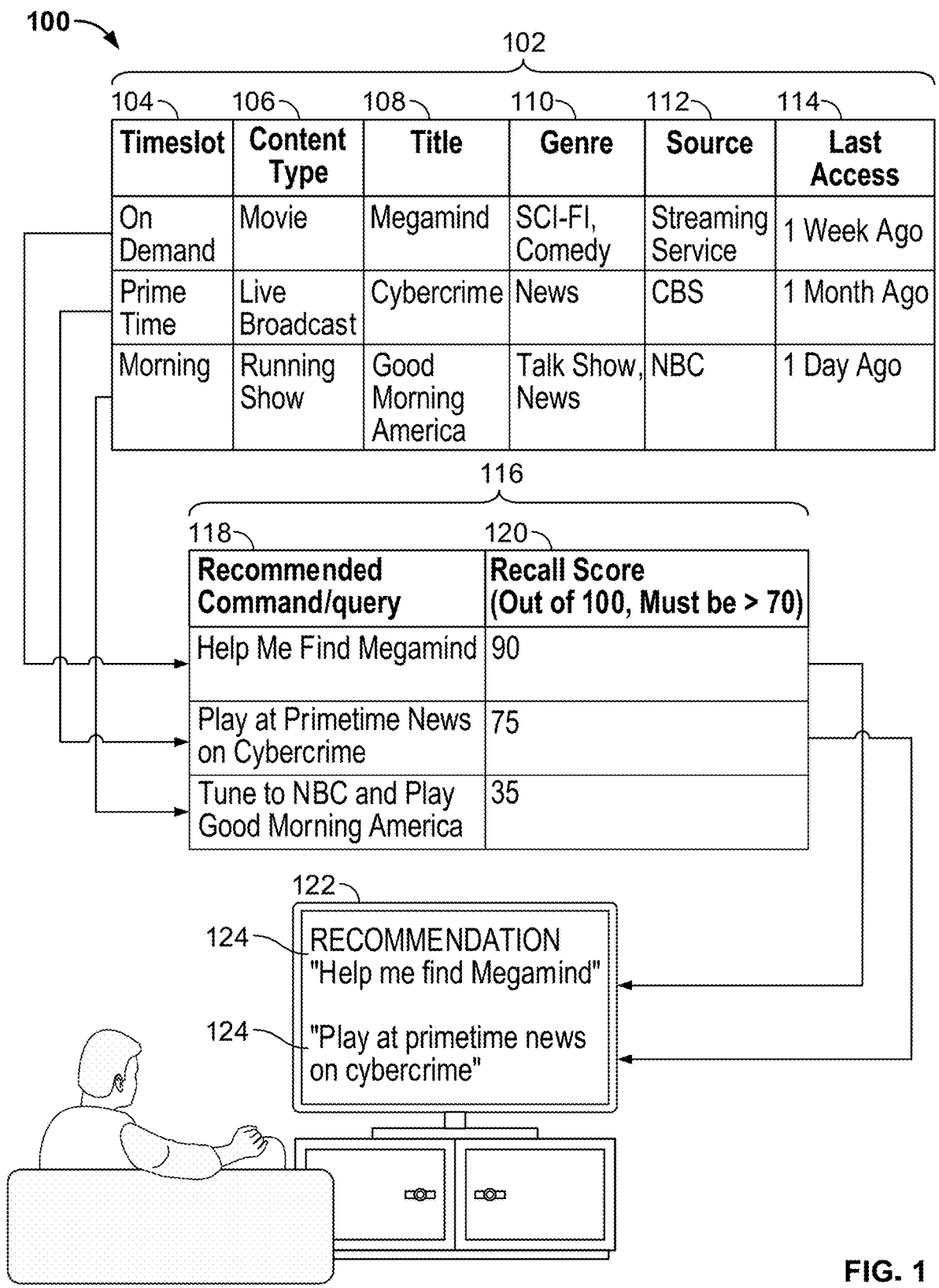
FIG. 1 is an example scenario in which a query suggestion application generates suggested commands/queries utilizing a verb for a user based on a user's activity on a platform interface, in accordance with some embodiments of the disclosure.

FIG. 1 depicts example suggestion scenario 100 in which a query suggestion application (hereafter "QSA") generates suggested commands/queries utilizing a verb for a user based on a user's activity on a platform interface. In some embodiments, one or more parts of or the entirety of the system is configured as a system implementing various features, processes, and components of FIGS. 2-8. Although FIG. 3 shows a certain number of components, in various examples, the interactive system may include fewer than the illustrated number of components and/or multiples of one or more illustrated number of components. Suggestion scenario 100 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively).

Suggestion scenario 100 comprises database 102. Database 102 may be compiled by a computing device represented computing device 302 of FIG. 3 and may be stored either in local or remote memory for access by a QSA. Database 102 represents a database of assets available through an interface corresponding to a content platform and may also serve as a source of a collection of example parameters that may be utilized by the QSA to generate candidate voice commands. An example of database 102 may include a user activity log that includes recent searches conducted by the user and recent assets accessed. Recent assets may be utilized by the QSA to formulate suggested commands/queries. For example, the recent assets may be utilized to recommend for new content items for a user to view based on various parameters discussed herein (e.g., assets with similar titles, genres, timeslots, or subject matter may be identified by the QSA based on user activity and user to populate templates).

Parameter 104 corresponds to a timeslot parameter that reports through which time-based interface a user accessed a particular media asset. For example, a user may have accessed a movie through an on-demand interface. The QSA may detect when a user accesses the on-demand interface and may generate command recommendations when the user is active on the on-demand interface. Alternatively, the QSA may detect a time of day when a user typically accesses the on-demand interface and may generate on-demand-based suggestions when a user is active on the interface that utilizes the QSA during the time of day the user historically accesses the on-demand portion the interface. In some other examples, parameter 104 may report a particular broadcast time for a live stream such as a known broadcast window considered as primetime or a morning time slot.

Parameter 106 corresponds to a content-type parameter for each content item accessed by the user through the interface utilizing the QSA. For example, a content item may be a movie, a live broadcast, a running show, or some combination thereof. Parameter 106 may be utilized by the QSA to generate related recommendations for a user to encourage user engagement with the interface using the QSA. For example, if a user prefers movies, then the QSA may either focus suggestions on additional movies or may attempt to broaden the user's preferences by recommending content items that are not movies and are instead running shows. The QSA may continuously monitor whether a user is willing to access other content types based on the suggestions and may factor in the user's engagement with the recommendations as part of the rationale for generating new recommendations.

In some embodiments, the QSA may be configured to utilize an intent analyzer that is analogous to the intent analyzer described in U.S. patent application Ser. No. 16/171,093 to Murali Aravamudan et al., and is comparable to the recommendation engine of U.S. patent application Ser. No. 16/528,537 to Siddartha Pande et al., both of which are hereby incorporated by reference herein in their entireties. The intent analyzer maybe utilized to identify a portion of a string of characters provided by a user that corresponds to a particular media asset or a particular command, based at least in part on past user activity on an interface that utilizes the QSA. Natural language processing may be incorporated into the various steps described herein to enable the QSA to derive, from various inputs, intent, so as to generate appropriate candidate recommendations. In some embodiments, the QSA and/or the intent analyzer may incorporate the Word2vec technique for natural language processing.

Parameter 108 corresponds to a title parameter for each content item accessed by the user through the interface utilizing the QSA. Parameter 108 may be utilized by an intent analyzer to identify related titles for additional recommendations as part of generating the suggested commands/queries. Parameter 110 corresponds to a genre parameter for each content item accessed by the user through the interface utilizing the QSA. Parameter 110 may be utilized in combination with or in a manner similar to parameter 108 by the QSA to generate recommendations to encourage user engagement with the interface. Parameter 112 corresponds to sources of the content items selected by the user. Parameter 112 may be utilized on interfaces that incorporate a plurality of content platforms in order to provide a user with access to content items across the plurality of content platforms through a single interface. Parameter 112 may also be utilized to establish source links such that, should a user engage with the interface by selecting a suggestion, the QSA may provide the user access to the content item by an embedded link. Parameter 114 corresponds to a last access parameter which indicates how recently a user last accessed a particular content item. Parameter 114 may be used to rank or order a display of suggested commands to ensure a user has ready access to content items a user has shown more frequent or the most recent interest in (e.g., enable a user to continue viewing progress in a movie or a serial program).

Compiled suggestion table 116 corresponds to a set of and/or one or more suggested commands generated by the QSA based on database 102. Recommended commands/queries 118 correspond to command templates that are populated based on the various parameters in database 102. Each of the templates may be retrieved from local or remote storage, as depicted by the various components in FIG. 3. For example, the templates may include at least one verb corresponding to a command and a blank space that may be populated by metadata corresponding to a content item. Some examples of templates with spaces for metadata to be populated by the QSA include "Help me find <PROGRAM_NAME>," "Find me <PROGRAM_NAME," "Play at <TIME_SLOT> news on <GENRE>," and "Tune to <CHANNEL_NAME> and play <PROGRAM_NAME>." The format of the templates may be adjusted based on a review of activity related to the suggestions. For example, if the QSA determines a suggestion with a certain orientation of metadata to verb leads to an increased likelihood of use, then additional templates may be formatted based on that structure (e.g., "Help me find <PROGRAM_NAME>" may result in more use than "Find me <PROGRAM_NAME").

Once the templates are retrieved, pertinent parameters are taken from database 102 and used to modify the templates to create each of recommended commands/queries 118 (e.g., a user watched the movie "Megamind" one week ago, and that was used to generate the recommended command "Help me find Megamind"). Associated with each of recommended commands/queries 118 is a respective recall score as represented by recall scores 120. In some embodiments, the QSA may compare recall scores 120 to a threshold recall score to determine if any or all of recommended commands/queries 118 meet or exceed the threshold recall score to identify the generated commands that are most likely to be used by a user to increase user engagement with the interface. For example, the threshold recall score may be 70 and the QSA may output only the suggested commands that have a recall score that is 70 or greater.

The recall score may be generated by accruing scalar values assigned by the QSA based on a detection of phonetic features (e.g., rhymes, rhythm, and/or phonemes of various terms in various languages). In some embodiments, the QSA may determine one or fewer suggested commands meet or exceed the threshold recall score and may modify the suggested commands to include additional phonetic features to increase the score. In some embodiments, the recall score may be generated based on a function encoded in the QSA that assigns a score based on a relationship between metadata from content items, user activity prior to the suggestion, user engagement with the suggestion, and phonetic features. The function may comprise any mathematical formula that is suitable to correlate a numerical value to the various inputs available to the QSA. In some embodiments, the function may be a cross product of matrices generated for each query. Each matrix may comprise vectors akin to those utilized in the intent analyzer to generate recommendations. Values corresponding to the vectors may be based on a strength of association or a potential retention likelihood based on the suggestion.

In some embodiments, at least one of the first phonetic feature or second phonetic feature comprises a phoneme. For example, the first phonetic feature may comprise a sound corresponding to the letters "th," and the second phonetic feature may comprise a sound corresponding to the letters "ng." The QSA may determine the relative position of each of these phonemes to the other and may calculate a relatively low recall score based on the fact that positioning of the first phoneme and the second phoneme within a candidate voice command does not create a rhyme. In another example, both the first and second phoneme are either "th" or "ng" which results in a relatively high recall score being calculated considering the positioning of the first phoneme and the second phoneme within a candidate voice command does create a rhyme.

In some embodiments, the recall score is based on a rhythm of the first clause of a candidate voice command as compared to the rhythm of the second clause of the candidate voice command. For example, a first phoneme may be detected in the first clause and the first phoneme may be a number of syllables away from a second phoneme of the first clause. A third phoneme, similar to the first phoneme, may be detected in the second clause and the third phoneme may be a same number of syllables away from a third phoneme in the second clause, similar to the second phoneme of the first clause. In this example, the candidate voice command with matching phonemes and matching rhythms as determined by the spacing of phonetically similar phonemes between clauses may have a higher generated recall score than a candidate voice command that either has matching rhythm or matching phonemes. In some embodiments, the respective contributing weights of features such as matching phonemes or matching rhythm as determined by syllable count may be based on either a scalar value (e.g., a matching phoneme is given a score of 10 and that 10 is multiplied by the number of occurrences in a candidate command) or a proportional contribution value (e.g., a matching phoneme is considered 50% of a passing score and at least two pairs of matching phonemes is considered an automatic pass). In some embodiments, the analysis for rhythm is performed based on meter (e.g., beat, cadence, or measure of words that have a same syllable count but are phonetically pronounced different based on the phonemes).

In some embodiments, the respective recall score may be increased based on the determination that a candidate voice command comprises a rhythm. The QSA may determine a first number of syllables in a first clause of a candidate voice command and a first rate of speech corresponding to the first number of syllables that a user is expected to speak the first clause of the candidate voice command. The QSA may also determine a second number of syllables in a second clause of the candidate voice command and a second rate of speech corresponding to the second number of syllables that a user is expected to speak the second clause of the candidate voice command. The QSA may compare the first number of syllables to the second number of syllables and the first rate of speech to the second rate of speech in order to determine there are similar phonemes equally spaced between the first clause and the second clause. In response to determining the first number of syllables matches the second number of syllables, the QSA may increase the respective recall score by a first scalar value. In response to determining the first rate of speech matches the second rate of speech, the QSA may increase the respective recall score by a second scalar value.

In some embodiments, the respective recall score may be increased in response to detecting a rhyme between a first clause and a second clause of a candidate voice command. For example, the QSA may determine a first phoneme in a first clause sounds similar to a second phoneme in a second clause. The QSA may be configured to increase the score based on the detection of phonetic features such as rhythm and rhymes. To determine if there is a rhyme, the QSA may identify a first phoneme in a first clause of a candidate voice command and a second phoneme in a second clause of the candidate voice command. The QSA may consider the first position of the first phoneme in the first clause and the second position of the second phoneme in the second clause. If the phonemes comprise similar audible sounds and are positioned in similar positions in respective clauses, the QSA may determine the candidate voice command comprises a rhyme between the first clause and the second clause. As a result, the QSA may increase the respective recall score by a scalar value.

In some embodiments, the QSA may utilize aspects of the International Phonetic Alphabet to identify phonemes based on language settings associated with the QSA. For example, a user may switch between language settings such that the QSA processes inputs and provides recommendations based on the language settings (e.g., may have a base setting for American English, which may be changed to Spanish, either based on location of a device utilizing the QSA or an option selected by a user). The QSA may be configured to identify phonemes corresponding to the language setting and may also generate hybrid recommendations in order to generate recommendations that have increased recall scores. For example, the QSA may recognize a user is familiar with both American English and Spanish settings. The QSA may generate recommended commands that incorporate both American English and Spanish terms that utilize similar phonemes as verified by the International Phonetic Alphabet to increase a user's engagement with the interface utilizing the QSA. In some embodiments, the International Phonetic Alphabet may be used to improve the detection of rhythm and/or rhymes within a candidate voice command in order increase the overall recall score.

In some embodiments, the QSA is configured to ensure a user increases engagement with a platform or interface by generating candidate voice commands that are phonetically dissimilar. For example, if the QSA starts with a set of four voice command templates and only one of the four voice command templates is used with frequency when recommended to the user, the QSA may search for additional words on a server to populate the templates with new words that have synonymous meanings and dissimilar phonetic features to increase the number of possible voice query templates. In another example, if the QSA starts with a first set of and/or one or more filler words and only one filler word results in a candidate voice command being used with regularity, the QSA may also search for additional filler words on a server to populate the templates with new filler words that have meanings synonymous with to the original filler words and create dissimilar phonetic features to increase the number of possible voice query recommendations.

Computing device 122 comprises a display. Computing device 122 may be represented by computing device 302 of FIG. 3 and may incorporate any or all of the elements depicted in FIG. 3. The display of computing device 122 includes visual elements and may also include audio elements. For example, suggestions 124 may be visible for the user on the display of computing device 122 and/or may be audibly projected to the user through speakers of computing device 122. Each of suggestions 124 corresponds to one of recommended commands/queries 118 which exceeds a threshold recall score as depicted in compiled suggestion table 116.

In some embodiments, the QSA may record and process user activity relative to each of the recommended commands/queries. For example, the QSA may track if each of the recommended commands/queries has been used a certain number of times (e.g., the QSA may track a number of times a particular template based on a particular verb is used). The accrued number of times a particular verb/template is used may be compared to a threshold and if the accrued number meets or exceeds the threshold, the QSA may access a server (e.g., server 304 of FIG. 3) to replace verbs/templates used to generate future suggestions, as depicted the exemplary process shown in FIG. 6, which may be executed by either of control circuitry 308 and/or 334 of FIG. 3. In another example, the QSA may track a number of times each of the recommended commands/queries are output without receiving an input corresponding to the suggestion. In this example, the accrued number of times a particular verb/template is output without a corresponding input (e.g., before a new suggestion or set of and/or one or more suggestions is generated) may be compared to a threshold, and if the accrued number meets or exceeds the threshold, the QSA may access a server (e.g., server 304 of FIG. 3) to replace verbs/templates used to generate future suggestions, as depicted in the exemplary process shown in FIG. 6, which may be executed by either of control circuitry 308 and/or 334 of FIG. 3.

Figure 2:
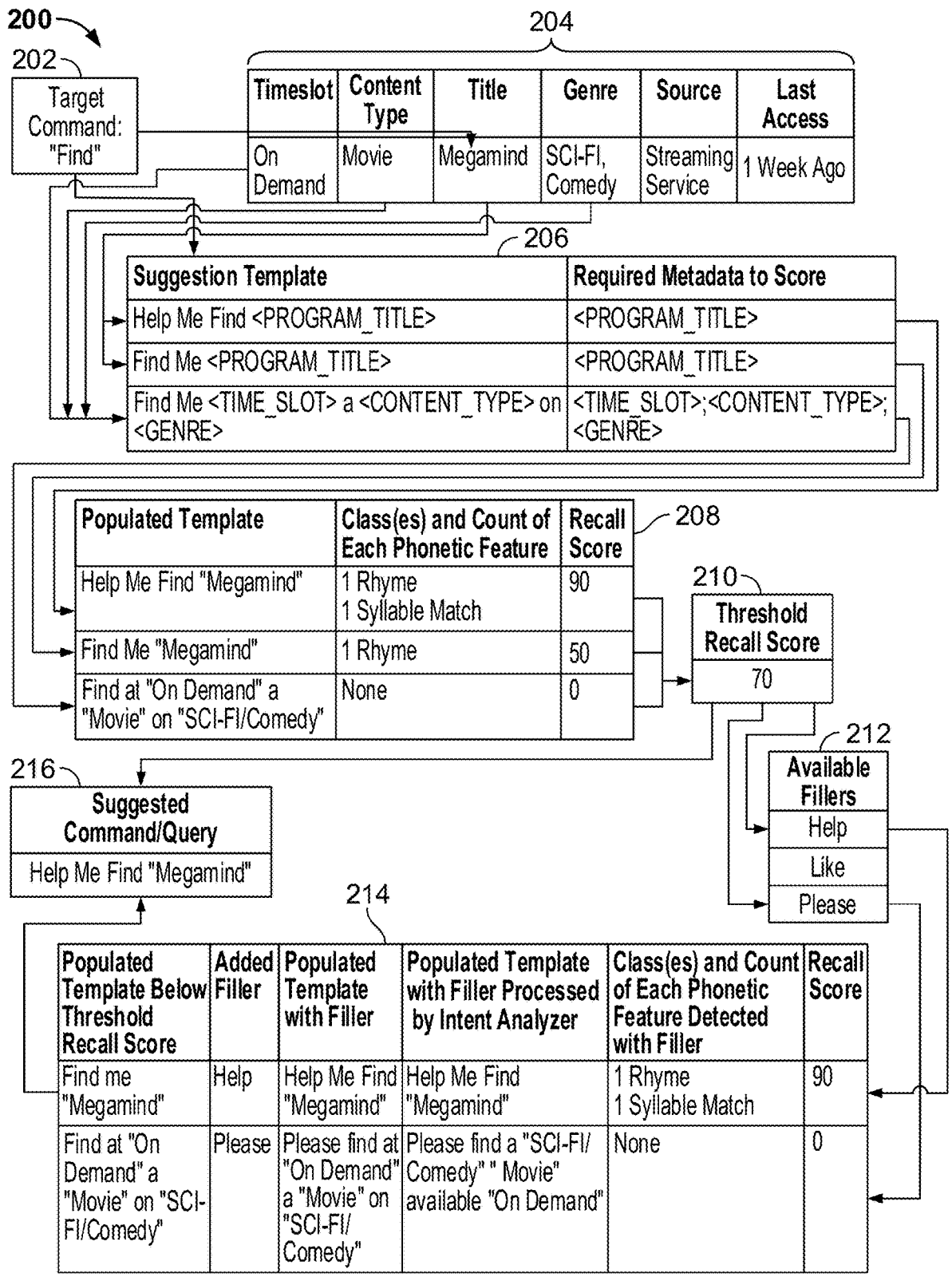
FIG. 2 is an example scenario in which a query suggestion application generates a recall score for generated commands/queries for ranking the generated commands/queries, in accordance with some embodiments of the disclosure.
Figure 3:
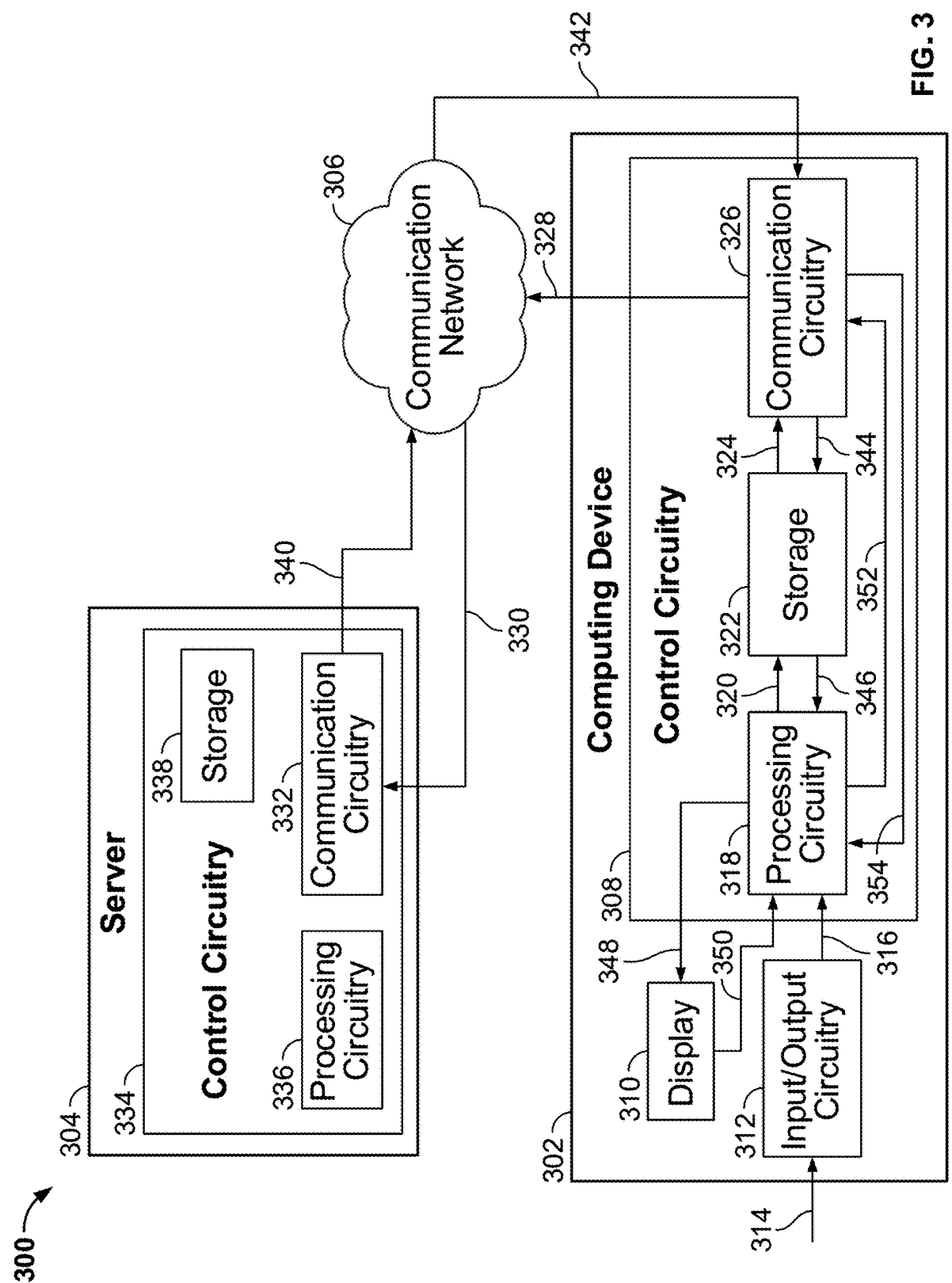
FIG. 3 is a block diagram representing an example suggestion system, in accordance with some embodiments of the disclosure.

FIG. 2 depicts suggestion scenario 200, in which a QSA generates a recall score for generated commands/queries for ranking the generated commands/queries, in accordance with some exemplary embodiments. In some embodiments, one or more parts of or the entirety of the system depicted is configured as a system implementing various features, processes, and components of FIGS. 1 and 3-8. Although FIG. 3 shows a certain number of components, in various examples, the interactive system may include fewer than the illustrated number of components and/or multiples of one or more illustrated components.

Suggestion scenario 200 depicts an exemplary process by which the QSA utilizes a target command to generate suggested commands, score the suggested commands, and present the suggested commands based on a review of recall scores. Suggestion scenario 200 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively). Target command 202 is identified by the QSA. Target command 202 may be a verb, such as "find," and may be determined based on past user activity, such as the access of the movie "Megamind," within a recent time period such as a week (e.g., past commands provided by the user may be parsed to identify a verb, or a verb may be generated as a command based on phonemes of parameters of past user activity such as recently accessed content item titles). Activity parameters 204 correspond to a single example of database 102 of FIG. 1. Activity parameters 204 outline the parameters of the movie "Megamind," which may be used to identify target command 202 (e.g., "find"). In some embodiments, the QSA may access a collection of user activity for multiple users across multiple devices to identify potential popular target verbs utilized across the platform. In some embodiments, the QSA may compare a single user's input data to a collection of other users' data to determine if a single user has not been exposed to target verbs that are retained well by other users. In this example, the QSA may present templates based on verbs popular among other users that a target user does not utilize.

In some embodiments, the QSA may identify terms that a user is inclined to use when constructing their own commands or inquiries. For example, a user may be inclined to use the term "search" instead of the word "find." In order to increase user engagement and tailor suggestions to a particular user, the QSA may identify terms synonymous with the user's inputs in order to increase the likelihood the user will utilize the suggested commands by updating voice command templates with the synonymous words (e.g., the QSA sets a target command 202 to "find" based on a review of data of other user activities indicating "find" is a commonly used and retained word that this particular user currently is not utilizing).

The QSA may receive an input corresponding to a command from the user. Based on the input, the QSA may identify a plurality of terms associated with the command based on a string of characters provided by the user. The QSA may compare the plurality of terms associated with the command to a plurality of terms comprising the plurality of voice command templates to identify templates that utilize terms similar to the terms provided by the user. The QSA may identify a subset of the plurality of voice command templates that are comprised of terms that are within a similarity threshold of the plurality of terms associated with the command. For example, the QSA may rely on phonetic features such as phonemes to determine similarity or other natural language processing strategies to identify if terms are either similar in sound or similar in meaning. In response to identifying the subset of the plurality of voice command templates, the QSA may replace the terms that are within the similarity threshold of the plurality of terms associated with the command with a respective term of the plurality of terms associated with the command provided by the user. The similarity threshold may correspond to a similarity value. The similarity value may be evaluated based on spelling, phonemes, definition, common use, and metrics such as rhythm, cadence or rhyme. For example, the similarity value may be a larger value where both the spelling of terms as well as the pronunciation creates similar phonemes. The more similarities between terms there are, the higher the similarity value is.

The QSA utilizes activity parameters 204 at least in part to identify suggestion templates for suggestion generation matrix 206. For example, each suggestion template available to the QSA comprises a set of and/or one or more terms that include verbs and fillers as well as parameters that need to be filled in. Some examples of parameters that need to be filled in to generate a suggested command are program title, time slot, genre, and/or broadcast channel. Each of these parameters may correspond to metadata associated with content items available through the interface. For example, either the QSA, the interface corresponding to the QSA, or a platform associated with the QSA may have access to or may assign metadata associated with each content item. The metadata corresponds to parameters such as those in database 102 of FIG. 1, which include a timeslot, a content type, a title, a genre, a source, and a last-access timestamp. The QSA may tabulate or organize templates based on the required metadata that needs to be filled in and may only access suggested command templates based on available metadata in the database of content items (e.g., only templates that require a program title will be utilized if only metadata related to a program title is available).

The QSA populates each identified template based on metadata available from the content item and/or the content item database to be scored in scoring table 208. Scoring table 208 shows four example suggested commands that are associated with the target command "find" and relate to a target content item (e.g., the movie "Megamind") based on recent user activity. Each suggested command is analyzed by the QSA for phonetic features. Phonetic features include, but are not limited to, rhythm between clauses, rhymes between clauses, matching syllable counts between clauses, similar phonemes between clauses of the same or different languages. Each phonetic feature is assigned a score and scores are accrued for each populated template based on the number and quality of phonetic features. For example, a rhyme with matching syllables between clauses may be awarded a higher score than a syllable match without a rhyme or without rhythm (e.g., "Help me find 'Megamind'" includes a rhyme and a syllable match between clauses and is scored higher than "Find me 'Megamind'" which only has a rhyme). In another example, if no phonetic features are detected that are recognized by the application as a feature to generate a score for, then the populated template may have a recall score of zero.

Each populated template is compared to threshold recall score 210. For example, a populated template that is considered most likely to increase user engagement and be recalled by the user may be awarded a score of 100, and the threshold score for generating the populated template as a suggested command may be 70. In this example, if the populated template incorporates enough phonetic features (e.g., rhymes, rhythm, and/or matching syllables) between clauses to achieve a recall score of 70 or more, the populated template is presented as suggested command 216. In some examples, a populated template may result in a recall score below 70.

For example, the recall score may be generated on a scale of 0 to 100. In this example, a score of 0 means there were no matching phonetic features between a first clause of a candidate voice command and a second clause of the same candidate voice command. A threshold recall score may, for example, be a score of 70 out of 100 and may be stored in memory. The score may be accrued based on factors such as the inclusion of matching phonemes, a rhyme, and a rhythmic match between syllables of the first clause and the second clause. Each of the phonetic features may be considered a phonetic feature type with a stored score value that is used to tally the recall score by the QSA. The QSA may also consider the brevity of a candidate voice command (e.g., "Please find Megamind" may be scored higher than "Help me find Megamind" if it is determined a user may recall commands with fewer syllables overall with more frequency than commands with more matching phonetic features that require the user to speak more syllables). In some embodiments, the threshold recall score may be adjusted depending on a user's use of candidate queries (e.g., the recall score may be lowered if the user selects recommended queries with a high frequency so that a user is not continuously provided a same template of queries to select from).

The QSA may access available fillers 212 to create more phonetic features within each populated template. Examples of fillers include, but are not limited to, terms such as "help," "now," "please," and/or "like." For example, the populated template "Find me 'Megamind'" may have had a score of 50, which does not meet or exceed 70, and the QSA may add "Help me" to the populate template to increase the score. As the QSA has already identified this suggestion as a recommendation to output, the QSA may proceed to generate only the suggestion that meets the threshold recall score. In some embodiments, available fillers 212 may be continuously updated based on the need for the QSA to develop more unique suggestions to maintain a level of user engagement. In some embodiments, either the elements of suggestion matrix 206 or the terms of fillers 212 may be identified by an intent analyzer capable of performing natural language processing to identify synonyms and other terms with related uses, meanings, or phonetic features in order to improve the library of suggestion templates and fillers.

In some embodiments, the generated recall score is compared to the threshold recall score to determine if any of the candidate voice commands should be generated as recommendations to the user. If, for example, a recall score of a candidate voice command is less than the threshold recall score, the QSA may identify a phonetic feature in a first clause and may modify the second dependent clause with a filler word from a memory in order to create a matching phonetic feature in the second clause. If a filler word is added to a candidate voice command, the recall score is regenerated and compared to the threshold recall score. If the revised second phonetic feature yields a revised respective recall score above the threshold score, the revised candidate voice command is output as a recommendation for the user to perceive (e.g., through visual indicators, audio indicators, or a combination thereof).

In some embodiments, the first clause may be modified with the filler word, instead of the second clause, depending on which of the first clause and second clause contains a phonetic feature that can be recreated using an available filler word. The modification may be accomplished through processing of a particular filler word with a particular template using an intent analyzer, which formats and arranges phrases based on the parameters used to configure the logic behind the QSA.

Modified scoring table 214 illustrates an example of updated recall scores being generated based on the addition of available fillers 212 to each of the suggestions from scoring table 208 that were below the threshold score. For example, the QSA may generate a recall score for the populated template "Find me 'Megamind'" of 50, based on the identification of a rhyme as a phonetic feature, which is below the threshold recall score 70. The filler word "help" may be identified by an intent analyzer corresponding to the QSA to modify the template. The template with the filler may be modified to become "Help me find 'Megamind'" and the QSA may identify an additional phonetic feature of a syllable match that, when combined with the previously detected rhyme, increases the recall score to 90, which exceeds the threshold. In this example, the modified template with the filler now exceeds the threshold recall score and may be generated for output by the QSA.

In another example, the QSA may generate a recall score for the populated template "Play at 'On Demand'" news on 'Megamind'" of 35, based on the detection of syllable match. In this example, the presence of a syllable match without any other features may be considered an imperfect rhyme that yields, based on a recall score function, a lower value than if the syllable match was detected as being paired with another feature such as a rhyme. The QSA may identify, using the intent analyzer, the filler word "like" as an adequate addition to maintain a grammatical structure to the populated template to create the modified template "Play at 'On Demand' news like 'Megamind,'" which still may be considered as retaining a syllable match between clauses without any new detected features. As a result, the QSA may generate an updated recall score that is also 35, considering the lack of additional features detected. This modified populated template may not be generated for output by the QSA as a result of the recall score failing to match or exceed the threshold score of 70 despite the modifications.

FIG. 3 depicts a block diagram representing exemplary suggestion system 300, in accordance with some exemplary embodiments. The system is shown to include computing device 302, server 304, and a communication network 306. It is understood that while a single instance of a component may be shown and described relative to FIG. 3, additional instances of the component may be employed. For example, server 304 may include, or may be incorporated in, more than one server. Similarly, communication network 306 may include, or may be incorporated in, more than one communication network. Server 304 is shown communicatively coupled to computing device 302 through communication network 306. While not shown in FIG. 3, server 304 may be directly communicatively coupled to computing device 302, for example, in a system absent or bypassing communication network 306.

Communication network 306 may include one or more network systems, such as, without limitation, Internet, LAN, Wi-Fi or other network systems suitable for audio processing applications. In some embodiments, the system of FIG. 3 excludes server 304, and functionality that would otherwise be implemented by server 304 is instead implemented by other components of the system depicted by FIG. 3, such as one or more components of communication network 306. In still other embodiments, server 304 works in conjunction with one or more components of communication network 306 to implement certain functionality described herein in a distributed or cooperative manner. Similarly, in some embodiments, the system depicted by FIG. 3 excludes computing device 302, and functionality that would otherwise be implemented by computing device 302 is instead implemented by other components of the system depicted by FIG. 3, such as one or more components of communication network 306 or server 304 or a combination of the same. In other embodiments, computing device 302 works in conjunction with one or more components of communication network 306 or server 304 to implement certain functionality described herein in a distributed or cooperative manner.

Computing device 302 includes control circuitry 308, display 310 and input/output circuitry 312. Control circuitry 308 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes communication circuitry 326, storage 322 and processing circuitry 318. Either of control circuitry 308 and 334 may be utilized to execute or perform any or all of the processes or steps depicted in FIGS. 1, 2, and 4-8 (e.g., as enabled by processing circuitries 318 and 336, respectively).

In addition to control circuitry 308 and 334, computing device 302 and server 304 may each include storage (storage 322, and storage 338, respectively). Each of storages 322 and 338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 322 and 338 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 322 and 338 or instead of storages 322 and 338. In some embodiments, a user profile and messages corresponding to a chain of communication may be stored in one or more of storages 322 and 338. Each of storages 322 and 338 may be utilized to stored commands on behalf of the QSA, for example, such that when each of processing circuitries 318 and 336, respectively, are prompted though control circuitries 308 and 334, respectively, either of processing circuitries 318 or 336 may execute any of the processes and examples depicted in FIGS. 1, 2, and 4-8, or any combination of steps thereof.

In some embodiments, control circuitry 308 and/or 334 executes instructions for an application stored in memory (e.g., storage 322 and/or storage 338). Specifically, control circuitry 308 and/or 334 may be instructed by the application to perform the functions discussed herein. In some implementations, any action performed by control circuitry 308 and/or 334 may be based on instructions received from the application. For example, the application may be implemented as software or a set of and/or one or more executable instructions that may be stored in storage 322 and/or 338 and executed by control circuitry 308 and/or 334. In some embodiments, the application may be a client/server application where only a client application resides on computing device 302, and a server application resides on server 304.

The application may be implemented using any suitable architecture. For example, it may be a stand-alone application wholly implemented on computing device 302. In such an approach, instructions for the application are stored locally (e.g., in storage 322), and data for use by the application is downloaded on a periodic basis (e.g., from an out-of-band feed, from an Internet resource, or using another suitable approach). Control circuitry 308 may retrieve instructions for the application from storage 322 and process the instructions to perform the functionality described herein. Based on the processed instructions, control circuitry 308 may determine a type of action to perform in response to input received from input/output circuitry 312 or from communication network 306.

In client/server-based embodiments, control circuitry 308 may include communication circuitry suitable for communicating with an application server (e.g., server 304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server-based application, control circuitry 308 runs a web browser that interprets web pages provided by a remote server (e.g., server 304). For example, the remote server may store the instructions for the application in a storage device.

Figure 7:
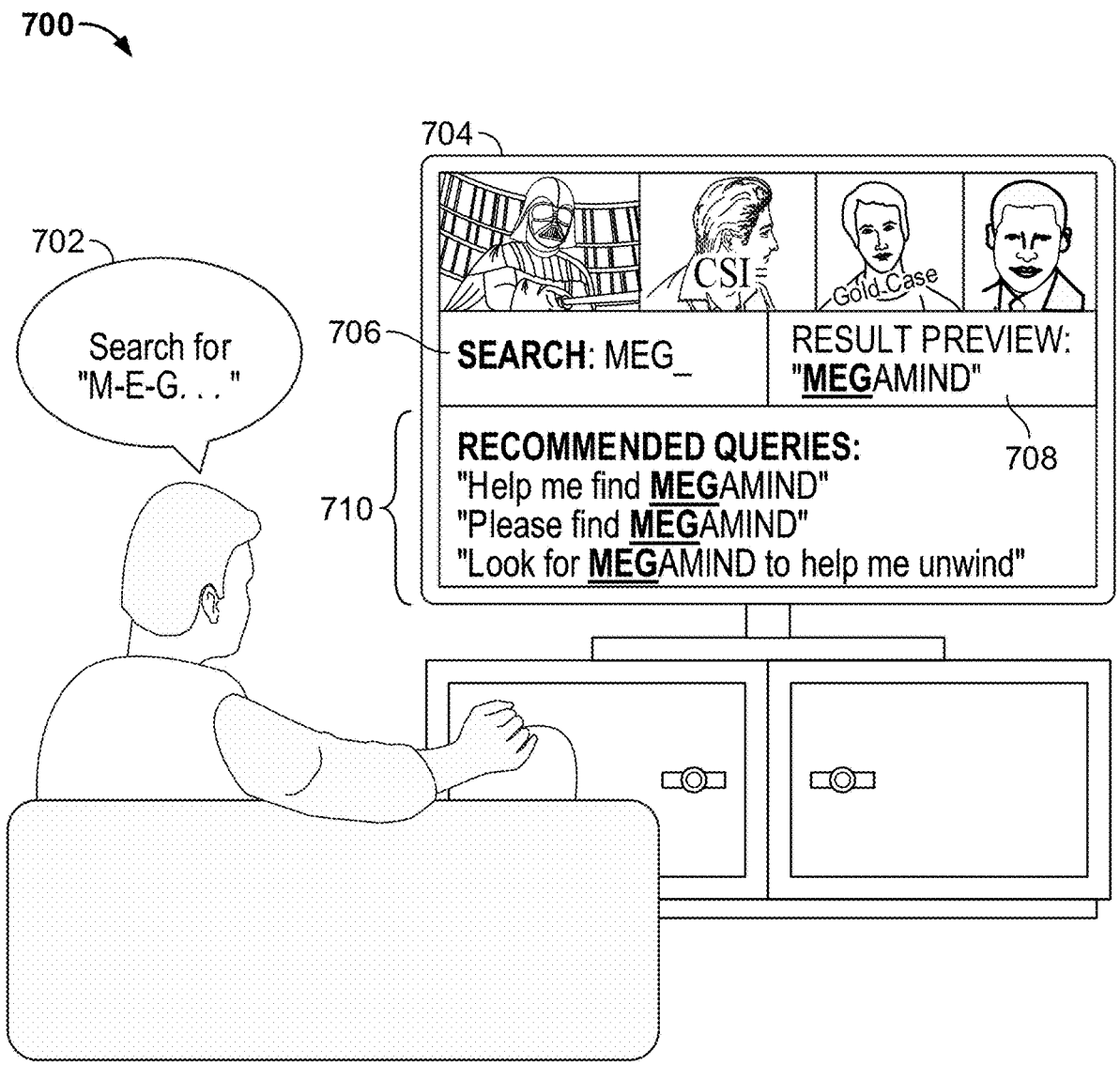
FIG. 7 is an example scenario where a user starts providing a command/query and the query suggestion application generates an interface with recommended commands/queries for the user to perceive, in accordance with some embodiments of the disclosure.

The remote server may process the stored instructions using circuitry (e.g., control circuitry 334) and/or generate displays. Computing device 302 may receive the displays generated by the remote server and may display the content of the displays locally via display 310. For example, display 310 may be utilized to present a string of characters corresponding to suggestions as shown in FIG. 7. This way, the processing of the instructions is performed remotely (e.g., by server 304) while the resulting displays, such as the display windows described elsewhere herein, are provided locally on computing device 304. Computing device 302 may receive inputs from the user via input/output circuitry 312 and transmit those inputs to the remote server for processing and generating the corresponding displays.

Alternatively, computing device 302 may receive inputs from the user via input/output circuitry 312 and process and display the received inputs locally, by control circuitry 308 and display 310, respectively. For example, input/output circuitry 312 may correspond to a keyboard and/or a set of and/or one or more speakers/microphones which are used to receive user inputs (e.g., input 702 as displayed in search bar 706 a display representing display 310 of FIG. 3 on computing device 704). Input/output circuitry 312 may also corresponds to a communication link between display 310 and control circuitry 308 such that display 310 updates in response to inputs received via input/output circuitry 312 (e.g., simultaneously update what is shown in display 310 based on inputs received by generating corresponding outputs based on instructions stored in memory via a non-transitory computer-readable medium).

Server 304 and computing device 302 may transmit and receive content and data such as media content via communication network 306. For example, server 304 may be a media content provider, and computing device 304 may be a smart television configured to download or stream media content, such as a live news broadcast, from server 304. Control circuitry 334, 308 may send and receive commands, requests, and other suitable data through communication network 306 using communication circuitry 332, 326, respectively. Alternatively, control circuitry 334, 308 may communicate directly with each other using communication circuitry 332, 326, respectively, avoiding communication network 306.

It is understood that computing device 302 is not limited to the embodiments and methods shown and described herein. In nonlimiting examples, computing device 302 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 302 receives user input 314 at input/output circuitry 312. For example, computing device 302 may receive a user input such as a user swipe or user touch. It is understood that computing device 302 is not limited to the embodiments and methods shown and described herein.

User input 314 may be received from a user selection-capturing interface that is separate from device 302, such as a remote-control device, trackpad or any other suitable user movement-sensitive, audio-sensitive or capture devices, or as part of device 302, such as a touchscreen of display 310. Transmission of user input 314 to computing device 302 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 312 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 318 may receive user input 314 from input/output circuitry 312 using communication path 316. Processing circuitry 318 may convert or translate the received user input 314 that may be in the form of audio data, visual data, gestures or movement to digital signals. In some embodiments, input/output circuitry 312 performs the translation to digital signals. In some embodiments, processing circuitry 318 (or processing circuitry 336, as the case may be) carries out disclosed processes and methods.

Processing circuitry 318 may provide requests to storage 322 by communication path 320. Storage 322 may provide requested information to processing circuitry 318 by communication path 346. Storage 322 may transfer a request for information to communication circuitry 326 which may translate or encode the request for information to a format receivable by communication network 306 before transferring the request for information by communication path 328. Communication network 306 may forward the translated or encoded request for information to communication circuitry 332, by communication paths 330.

At communication circuitry 332, the translated or encoded request for information, received through communication path 330, is translated or decoded for processing circuitry 336, which will provide a response to the request for information based on information available through control circuitry 334 or storage 338, or a combination thereof. The response to the request for information is then provided back to communication network 306 by communication path 340 in an encoded or translated format such that communication network 306 can forward the encoded or translated response back to communication circuitry 326 by communication path 342.

At communication circuitry 326, the encoded or translated response to the request for information may be provided directly back to processing circuitry 318 by communication path 354, or may be provided to storage 322 through communication path 344, which then provides the information to processing circuitry 318 by communication path 346. Processing circuitry 318 may also provide a request for information directly to communication circuitry 326 though communication path 352, where storage 326 responds to an information request, provided through communication path 320 or 344, by communication path 324 or 346 that storage 322 does not contain information pertaining to the request from processing circuitry 318.

Processing circuitry 318 may process the response to the request received through communication paths 346 or 354 and may provide instructions to display 310 for a notification to be provided to the users through communication path 348. Display 310 may incorporate a timer for providing the notification or may rely on inputs through input/output circuitry 312 from the user, which are forwarded through processing circuitry 318 through communication path 348, to determine how long or in what format to provide the notification. When display 310 determines the display has been completed, a notification may be provided to processing circuitry 318 through communication path 350.

The communication paths provided in FIG. 3 between computing device 302, server 304, communication network 306, and all subcomponents depicted are exemplary and may be modified to reduce processing time or enhance processing capabilities for each step in the processes disclosed herein by one skilled in the art.

Figure 4:
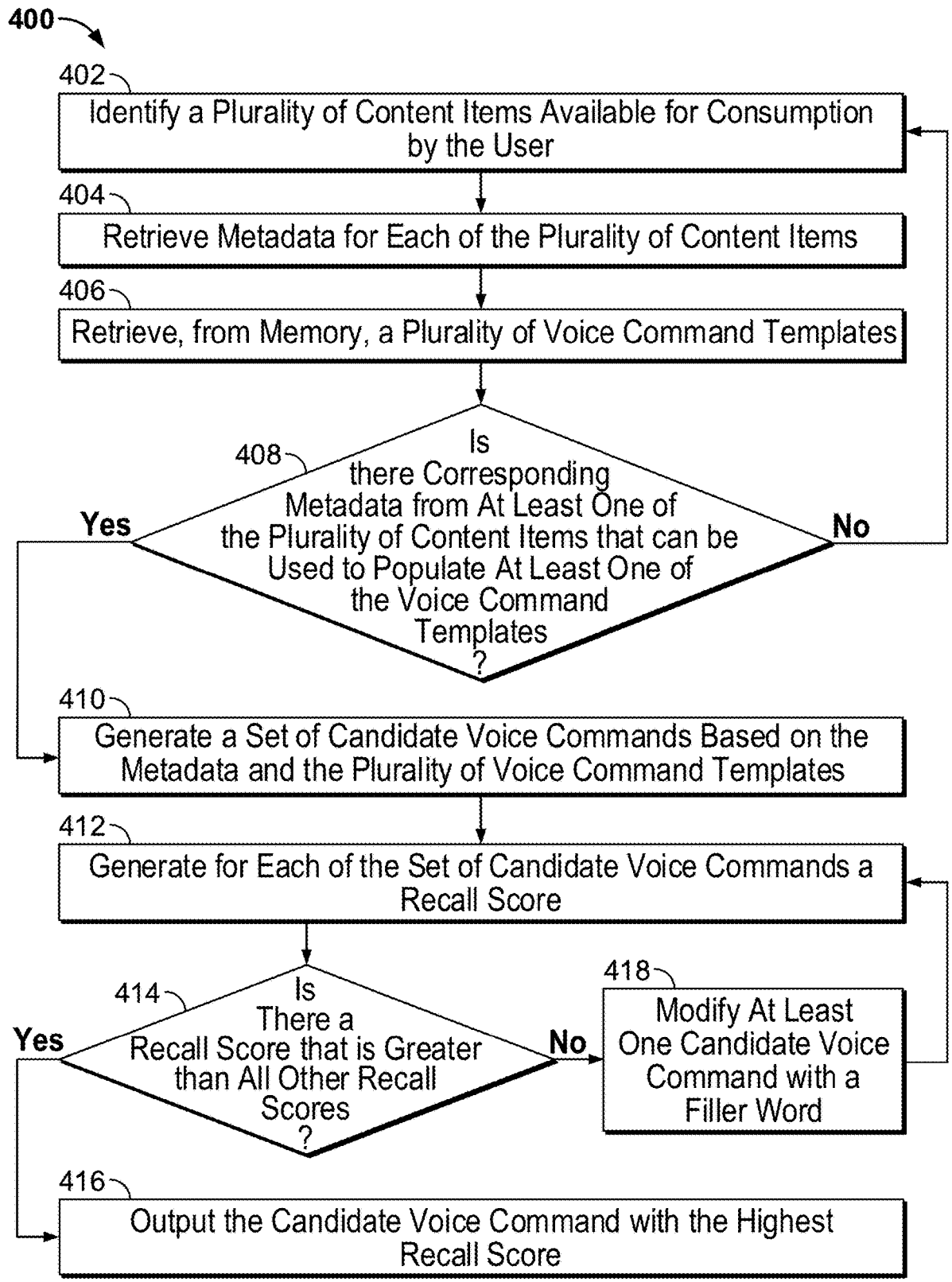
FIG. 4 is a flowchart representing an illustrative process for generating suggested commands/queries utilizing a verb for a user based on a user's activity on a platform interface, in accordance with some embodiments of the disclosure.

FIG. 4 depicts suggestion process 400 for suggesting a user input, in accordance with some exemplary embodiments. In some embodiments, one or more parts of or the entirety of the system configured to execute all or part of suggestion process 400 is configured as a system implementing various features, processes, and components of FIGS. 1-3, and 5-8. Although FIG. 3 shows a certain number of components, in various examples, the interactive system may include fewer than the illustrated number of components and/or multiples of one or more illustrated components.

It should be noted that the process depicted in FIG. 4 or any step thereof could be performed on, or provided by, any device shown in FIG. 3 and can incorporate various user interfaces (e.g., on display 310 of FIG. 3). For example, the process depicted in FIG. 4 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively). In addition, one or more steps of the process depicted in FIG. 4 may be incorporated into or combined with one or more steps of any other process or embodiment (e.g., starting at process block 502 in process 500 of FIG. 5, or starting at process block 602 of process 600 of FIG. 6). In addition, FIGS. 1, 2, 7, and 8 provide depictions of exemplary embodiments of the processes described herein as executed by suggestion system 300. For example, process 400 may be performed by various components of computing device 302 when that device executes instructions of the QSA stored in one or both of storages 322 and 338 (e.g., when stored as a non-transitory computer-readable medium).

At 402, control circuitry (e.g., one of or a combination of control circuitries 308 and/or 334, respectively, executing instructions stored as a non-transitory computer-readable medium in one of or a combination of storages 322 and/or 338, respectively, which, when executed, perform the various functions of this disclosure corresponding to the QSA) identifies a plurality of content items available for consumption. In some embodiments, the content items are made available through a single interface that pools media content items from various content platforms. In some embodiments, the content items are available through a plurality of servers or storage devices. In some embodiments, the plurality of content items is limited to available content items not consumed by the user, available content items consumed by the user, or some combination thereof between the various content platforms. Control circuitry may determine content items are available based on a subscription status of a user, an indexed database of content items associated with an interface configured to utilize the QSA, parental control settings correlated to maturity ratings of content items, and/or any form of data that may indicate the content is accessible to a user for whom the QSA may generate suggestions. At 404, the control circuitry retrieves metadata for each of the plurality of content items. For example, the metadata may include the parameters shown in database 102 of FIG. 1.

At 406, the control circuitry retrieves, from memory, a plurality of voice command templates. For example, the memory may be local or remote storage as shown in the system of FIG. 3. If the control circuitry determines that there is metadata from at least one of the plurality of content items that can be used to populate at least one of the voice command templates (YES at 408), the control circuitry proceeds to generate a set of and/or one or more candidate voice commands based on the metadata and the plurality of voice command templates at 410. If the control circuitry determines that there is not metadata from at least one of the plurality of content items that can be used to populate at least one of the voice command templates (NO at 408), the suggestion application proceeds to identify a new plurality of content items available for consumption by the user. For example, the application may identify a first plurality of content items without metadata that can be extracted from a platform embedded in the interface utilizing the application. The application may determine the platform does not utilize readable metadata and may identify content items from a different source to generate suggested commands.

At 412, the control circuitry generates a recall score for each of the set of and/or one or more candidate voice commands. The recall score may be generated based on an accrual of scalar values assigned to each detected phonetic feature in the populated templates or it may be generated based on a YES/NO criterion based on the detection of phonetic features in a candidate voice command. For example, the application may add a score of 10 for every rhyme detected in between clauses in a candidate voice command and the score may be compared to a threshold score, which defines a minimum score that a suggestion must accrue in order for the suggestion to be generated for output. In another example, the control circuitry may indicate "YES" for the presence of phonetic features that are of significance for increasing user recall or engagement with a platform, such as a rhyme or meter, which automatically leads to the generation of the candidate voice command as a suggestion for the user. The significance of particular phonetic features may be based on past user entries of commands or based on past user use of suggested commands. For example, if a user tends to recite commands that rhyme, the QSA may adapt its recommendations such that rhyming suggestions are readily generated as suggestions (e.g., using the control circuitry described herein).

If the control circuitry determines there is a recall score that is greater than all other recall scores (YES at 414), the control circuitry prepares the candidate voice command corresponding to the highest recall score for output (e.g., by generating for display characters corresponding to a suggestion on a display such as display 310 of FIG. 3 or a display shown on computing device 704 in FIG. 7 utilizing input/output circuitry to process and/or convey instructions to display the suggestions such as input/output circuitry 312 of FIG. 3) at 416. In some embodiments, the control circuitry may be configured to generate a specific number of suggestions for output (e.g., three) and may adjust a threshold recall score in order to enable the appropriate number of suggestions be output. If the control circuitry determines there is not a recall score that is greater than all other recall scores (NO at 414), the control circuitry proceeds to modify at least one voice command with a filler word at 418. For example, the filler words and modification process shown in FIG. 2 may be utilized. In some embodiments, the modification based on the filler word may be performed until at least one suggestion exceeds a threshold score. In some embodiments, the modification based on the filler word may be performed until a minimum number of suggestions have recall scores that satisfy threshold criteria for outputting to the user.

Figure 5:
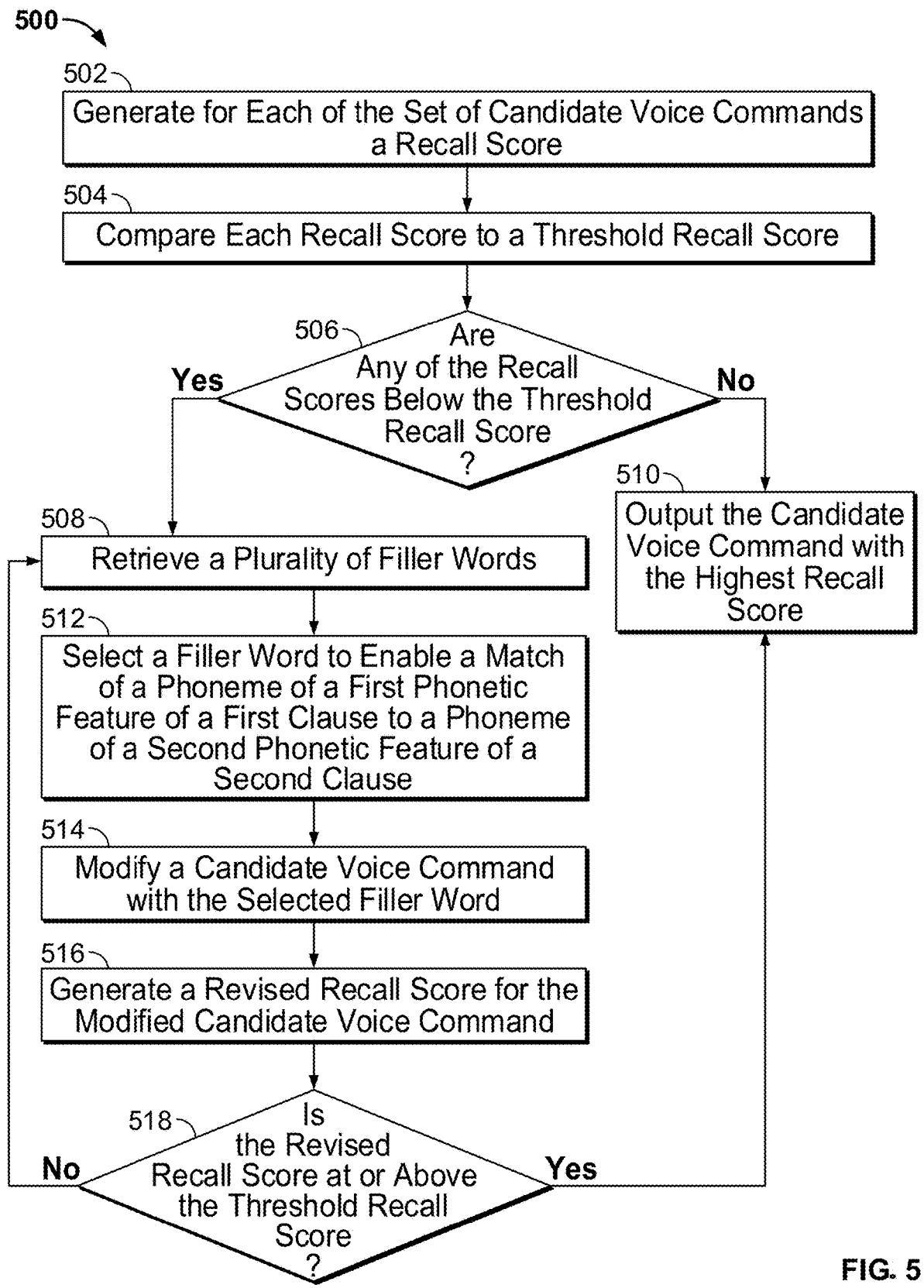
FIG. 5 is a flowchart representing an illustrative process for generating suggested commands/queries by incorporating filler words to increase a recall score to satisfy a threshold recall score, in accordance with some embodiments of the disclosure.

FIG. 5 depicts a flowchart representing process 500 for generating suggested commands/queries by incorporating filler words to increase a recall score to satisfy a threshold recall score, in accordance with some embodiments of the disclosure. In some embodiments, one or more parts of or the entirety of the system configured to execute all or part of suggestion process 400 is configured as a system implementing various features, processes, and components of FIGS. 1-4, and 6-8. Although FIG. 3 shows a certain number of components, in various examples, the interactive system may include fewer than the illustrated number of components and/or multiples of one or more illustrated components.

It should be noted that the process depicted in FIG. 5 or any step thereof could be performed on, or provided by, any device shown in FIG. 3 and can incorporate various user interfaces (e.g., on display 310 of FIG. 3). For example, the process depicted in FIG. 5 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively). In addition, one or more steps of the process depicted in FIG. 5 may be incorporated into or combined with one or more steps of any other process or embodiment (e.g., starting at process block 402 in process 400 of FIG. 4, or starting at process block 602 of process 600 of FIG. 6). In addition, FIGS. 1, 2, 7, and 8 provide depictions of exemplary embodiments of the processes described herein as executed by suggestion system 300. For example, process 500 may be performed by various components of computing device 302 when that device executes instructions of the QSA stored in one or both of storages 322 and 338 (e.g., when stored as a non-transitory computer-readable medium).

At 502, control circuitry (e.g., one of or a combination of control circuitries 308 and/or 334, respectively, executing instructions stored as a non-transitory computer-readable medium in one of or a combination of storages 322 and/or 338, respectively, which, when executed, perform the various functions of this disclosure corresponding to the QSA) generates for each set of and/or one or more candidate voice commands a recall score. The recall score may be generated by scoring similar to those described for process block 412 of process 400 of FIG. 4. At 504, the control circuitry compares each recall score to a threshold recall score. If the control circuitry determines that at least one of the recall scores is below the threshold recall score (YES at 506), the control circuitry proceeds to retrieve a plurality of filler words at 508. If the control circuitry determines that none of the recall scores is below the threshold recall score (NO at 506), the control circuitry outputs the candidate voice command with the highest recall score at 510. In some embodiments, the control circuitry may be configured to output a minimum number of suggestions (e.g., three suggested commands). The control circuitry may then output the minimum number of suggestions with the highest scores.

At 512, the control circuitry selects a filler word to enable a match of a phoneme of a first phonetic feature of a first clause of a candidate voice command to a phoneme of a second phonetic feature of a second clause. For example, the phoneme may be an "ind" sound and the phoneme may be spaced a certain number of syllables into a clause. As a result, the application may include a filler word such as "help" and add a pronoun such as "me" to convert a candidate command such as "Find me 'Megamind'" to "Help me find 'Megamind.'" The addition of the filler word enables a syllable match indicating a rhythm as well as a reinforcement of the existing rhyme as the rhyming phonemes would be spaced in matching positions between clauses of the candidate voice command. As a result, the control circuitry may generate a higher recall score for the modified suggestion based on the additional filler word. In some embodiments, the filler word is selected based on an intent analyzer which combines user activity with natural language processing to modify the populated command templates to create the highest possible scoring combinations by optimizing the including of higher-scoring phonetic features such as rhymes and rhythms.

At 514, the control circuitry modifies a candidate voice command with a selected filler word. At 516, the control circuitry generates a revised recall score for the modified candidate voice command based on the detection of additional or new phonetic features within the modified candidate voice command. If the control circuitry determines that the revised recall score is at or above a threshold recall score (YES at 518), the control circuitry proceeds to output the candidate voice command with the highest recall score at 510. In some embodiments, the control circuitry may be configured to output a minimum number of suggestions (e.g., three suggested commands). The control circuitry may then output the minimum number of suggestions with the highest scores, which may include the modified candidate voice command. If the control circuitry determines that the revised recall score is not at or above the threshold recall score (NO at 518), the control circuitry proceeds to retrieve the plurality of filler words at 508 to incorporate additional modifications to the candidate voice command in order to increase the number of scorable phonetic features (e.g., create rhythm, add a rhyme or rhymes, and/or match phonemes).

Figure 6:
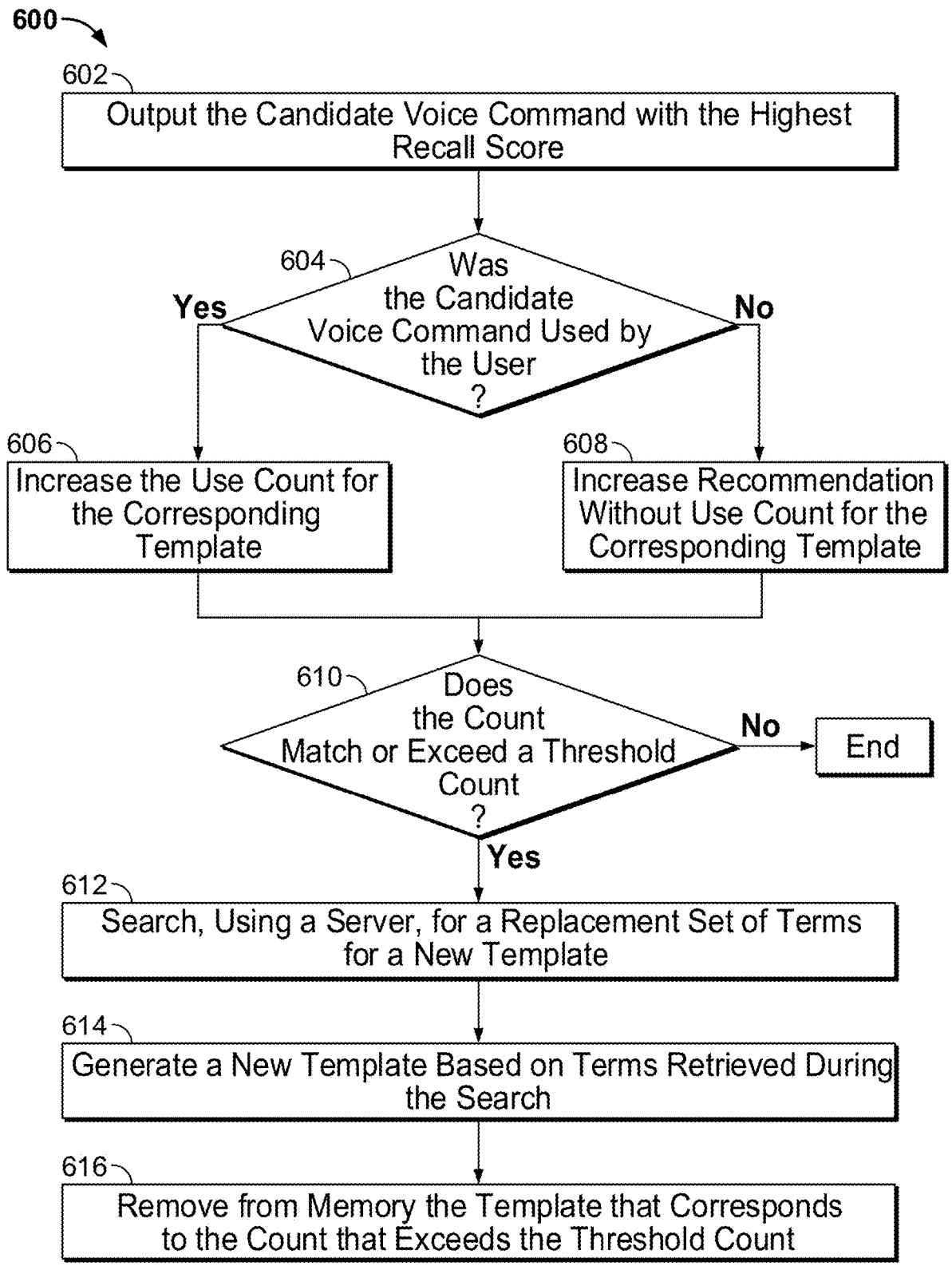
FIG. 6 is a flowchart representing an illustrative process for updating the voice command templates based on activity of a user of the query suggestion application, in accordance with some embodiments of the disclosure.

FIG. 6 depicts a flowchart representing process 600 for updating the voice command templates based on activity of a user of the application, in accordance with some embodiments of the disclosure. In some embodiments, one or more parts of or the entirety of the system configured to execute all or part of suggestion process 400 is configured as a system implementing various features, processes, and components of FIGS. 1-5, 7, and 8. Although FIG. 3 shows a certain number of components, in various examples, the interactive system may include fewer than the illustrated number of components and/or multiples of one or more illustrated components.

It should be noted that the process depicted in FIG. 6 or any step thereof could be performed on, or provided by, any device shown in FIG. 3 and can incorporate various user interfaces (e.g., on display 310 of FIG. 3). For example, the process depicted in FIG. 6 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively). In addition, one or more steps of the process depicted in FIG. 6 may be incorporated into or combined with one or more steps of any other process or embodiment (e.g., starting at process block 402 in process 400 of FIG. 4, or starting at process block 502 of process 500 of FIG. 5). In addition, FIGS. 1, 2, 7, and 8 provide depictions of exemplary embodiments of the processes described herein as executed by suggestion system 300. For example, process 600 may be performed by various components of computing device 302 when that device executes instructions of the QSA stored in one or both of storages 322 and 338 (e.g., when stored as a non-transitory computer-readable medium).

At 602, control circuitry (e.g., one of or a combination of control circuitries 308 and/or 334, respectively, executing instructions stored as a non-transitory computer-readable medium in one of or a combination of storages 322 and/or 338, respectively, which, when executed, perform the various functions of this disclosure corresponding to the QSA) outputs the candidate voice command with the highest recall score. In some embodiments, the control circuitry may be configured to output a minimum number of suggestions (e.g., three suggested commands). The control circuitry may then output the minimum number of suggestions with the highest scores. If the control circuitry determines that the candidate voice command was used by the user (YES at 604), the control circuitry proceeds to increment or increase a use count for the corresponding command template at 606. If the control circuitry determines that the candidate voice command was not used by the user before the generation of subsequent suggested commands (NO at 604), the control circuitry proceeds to increment or increase a recommendation without use count for the corresponding command template at 608.

If the control circuitry determines either the use count or the recommendation without use count exceeds a threshold count (YES at 610), the control circuitry proceeds to search for a replacement set of and/or one or more terms to generate at least one new template at 612. In some embodiments, the control circuitry utilizes terms available on a server. In some embodiments, the search includes searching for additional and/or replacement filler words. In some embodiments, the control circuitry may utilize the intent analyzer to identify synonyms and other related terms to modify the construction of the varying templates and/or to perform searches for additional terms. If the control circuitry determines either the use count or the recommendation without use count does not exceed a threshold count (NO at 610), the control circuitry proceeds to pause or end processing other than to monitor and increment or increase either the use count or the recommendation without use count.

At 614, the control circuitry generates at least one new template based on the terms accrued or retrieved from the search conducted at 612. At 616, the control circuitry removes from memory the template that corresponds to the count that exceeds the threshold count. In some embodiments, the control circuitry is configured to continuously update templates to generate new templates with each iteration of suggestions. In some embodiments, the control circuitry is configured to update templates and filler words based on the ability of the user to retain and use suggestions such that the user is regularly provided with new formatted suggestions.

FIG. 7 depicts scenario 700 where a user starts providing a command/query and the application generates an interface with recommended commands/queries for output, in accordance with some embodiments of the disclosure. In some embodiments, one or more parts of or the entirety of the system configured to execute all or part of suggestion process 700 is configured as a system implementing various features, processes, and components of FIGS. 1-6 and 8. Although FIG. 3 shows a certain number of components, in various examples, the interactive system may include fewer than the illustrated number of components and/or multiples of one or more illustrated components. Scenario 700 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively).

Scenario 700 comprises a user providing input 702. Input 702 may be an audible input, or an input entered into an interface using components as depicted in computing device 302 of FIG. 3. For example, input 702 may be typed into a search bar. Input 702 may comprise the start of a command (e.g., "Search for" followed by a start of a string of characters). For example, a user may begin to form a query and the query suggestion application may begin the following process to generate suggested queries for the user to utilize. In other examples, the query suggestion application may begin to generate suggested queries based on different inputs such as detecting a user is browsing, detecting the user is active on one or more devices, determining a typical activity window is approaching (e.g., after 6:00 PM the user typically starts browsing), or the query suggestion application may regularly generate suggested queries such that there are new queries available whenever the platform corresponding to the query suggestion application is accessed. Input 702 is received by computing device 704. Computing device 704 may comprise a display, such as the display shown on computing device 302 of FIG. 3. Computing device 704 may display the interface that utilizes the QSA. Search bar 706 is displayed on computing device 704 and may be updated based on the string of characters from input 702 (e.g., since the user said "Search for" the search bar starts to get populated by the subsequent string of characters as provided by the user).

In some embodiments, the suggestions may be displayed on startup of a platform that utilizes the QSA. In some embodiments, the suggestions may be displayed when a user activates a voice-based command. In some embodiments, the suggestions may be displayed in a browsing page corresponding to the platform that provides access to the content items. The suggestions may be displayed or audibly provided in any manner that would entice a user to engage and utilize the suggestions.

Result preview 708 is generated based on the QSA analyzing input 702 as compared to a user's activity log or a database corresponding to activity related to content items available through a content platform corresponding to the QSA. The user's activity log may be represented by database 102 of FIG. 1, representing a user's recent activity with respect to the interface associated with the suggested application. The database may be analyzed by the intent analyzer along with input 702 to generate a preview of a potential search result based on the string of characters received as part of input 702. For example, input 702 includes the letters M, E, and G, which may be determined to be a prefix of the movie title "Megamind" which was recently accessed by the user. As a result, the QSA may determine the user might be trying to find the same content item again and may generate recommended queries 710 corresponding to result preview 708, which is based on the combination of an analysis of the user's input and the database of content items. Recommended queries 710 may be generated by any of the processes and embodiments depicted in FIGS. 1-6. Each of recommended queries 710 may include a highlighted portion of the recommended query corresponding to a portion of input 702 such that a user may visualize how the QSA is processing inputs and generating recommendations. This may enable a user to work with the QSA to cultivate suggestions that most align with intended inputs (e.g., a user may correlate terms or characters provided with particular suggestions and may increase the rate of providing inputs of a certain format in order to generate suggestions the user is most inclined to use).

Figure 8:
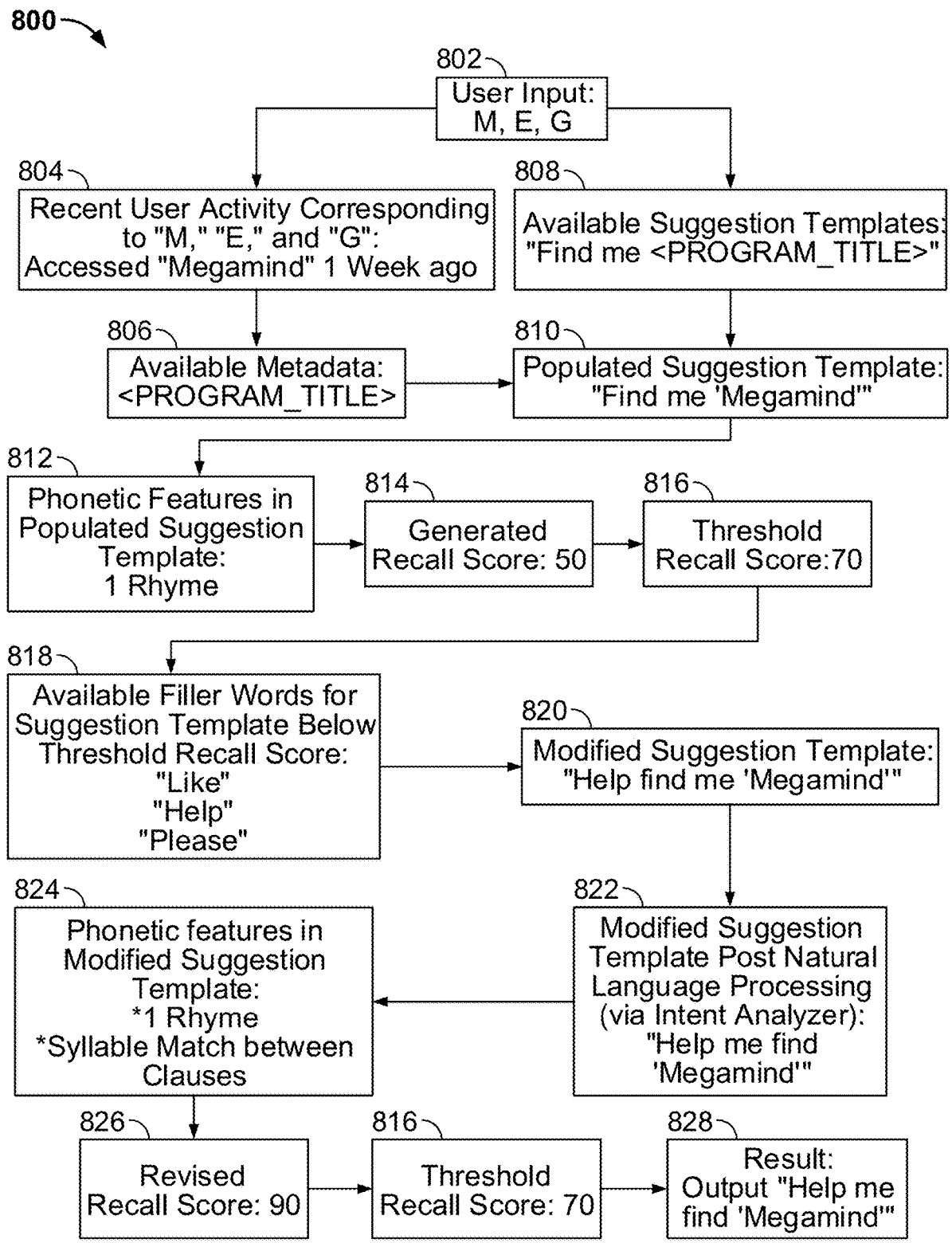
FIG. 8 is an example scenario where a recall score is generated and updated for a candidate voice command based on the detection and addition of phonetic features, in accordance with some embodiments of the disclosure.

FIG. 8 depicts scoring scenario 800, where a recall score is generated and updated for a candidate voice command based on the detection and addition of phonetic features, in accordance with some embodiments of the disclosure. In some embodiments, one or more parts of or the entirety of the system configured to execute all or part of scenario 800 is configured as a system implementing various features, processes, and components of FIGS. 1-7. Although FIG. 8 shows a certain number of components, in various examples, the interactive system may include fewer than the illustrated number of components and/or multiples of one or more illustrated components. Scoring scenario 800 may be executed by control circuitry of a computing device, such as computing device 302 and/or server 304 of FIG. 3 and/or any of the corresponding components depicted in FIG. 3 (e.g., utilizing a one of or a combination of processing circuitries 318 and/or 336 as part of control circuitries 308 and/or 334, respectively, executing instructions stored as a non-transitory computer-readable medium in one of or a combination of storages 322 and/or 338, respectively).

Scoring scenario 800 comprises user input 802, which includes a string of characters to kick off the processing by the control circuitry (e.g., utilizing one of or a combination of control circuitries 308 and/or 334, respectively, executing instructions stored as a non-transitory computer-readable medium in one of or a combination of storages 322 and/or 338, respectively, which, when executed, perform the various functions of this disclosure corresponding to the QSA). For example, the string of characters may include the letters M, E, and G. The control circuitry retrieves recent user activity 804, which is narrowed by user input 802 (e.g., the letters M, E, and G in the provided order are used to identify recent user activity on the interface associated with the QSA). Based on retrieved user activity 804, available metadata 806 is identified. For example, if the recent user activity associated with user input 802 is the movie "Megamind," then available metadata may include metadata indicating the movie title. In some embodiments, the QSA may simultaneously queue available suggestion templates 808. Available suggestion templates 808 may include a template formatted as, "Find me <PROGRAM_TITLE>" where a portion of the template is available for insertion of available metadata 806.

Available metadata 806 is used by the control circuitry to populate available suggestion templates by generating populated suggestion template 808 (e.g., "Find me <PROGRAM_TITLE>" becomes "Find me 'Megamind'"). Once the QSA generates populated suggestion template 808, the QSA analyzes populated suggestion template 808 for phonetic feature to score and identifies phonetic features 812, which includes a count of each phonetic feature (e.g., one rhyme). Based on phonetic features 812, generated recall score 814 is evaluated by the control circuitry based on the count and type of phonetic features detected in phonetic features 812 (e.g., one rhyme is evaluated to be worth a score of 50). Generated recall score 814 is compared to threshold recall score 816. When the control circuitry determines generated recall score 814 is less than threshold recall score 816 (e.g., 50 is less than 70), available filler words 818 are identified (e.g., words such as Like, Help, and Please).

From the available filler words, at least one is selected and is used by the control circuitry to modify the populated suggestion template to generate modified suggestion template 820. In some embodiments, if an intent analyzer or natural language processor determines the modified suggestion template still lacks phonetic feature balance between clauses, the intent analyzer or natural language processor associated with the QSA may modify the order of the terms of the modified suggestion template to generate post natural language processing modified suggestion template 822 (e.g., "Help find me 'Megamind'" becomes "Help me find 'Megamind'"). Post natural language processing modified suggestion template 822 is analyzed by the control circuitry for phonetic features and phonetic features 824 are identified (e.g., one rhyme and syllable match between clauses).

Based on phonetic features 824, revised recall score 826 is generated (e.g., 90 considering a score of 50 was applied for one rhyme and another score of 40 was accrued in addition to the score of 50 for the syllable match between clauses) and compared to threshold recall score 816. As revised recall score 826 exceeds threshold recall score 816, result 828 for the control circuitry is to output post natural language processing modified suggestion template 822 (e.g., by generating for display characters corresponding to a suggestion on a display such as display 310 of FIG. 3 or a display shown on computing device 704 in FIG. 7 utilizing input/output circuitry to process and/or convey instructions to display the suggestions such as input/output circuitry 312 of FIG. 3).

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
    identifying a plurality of content items available for consumption, wherein the identification is based on a search performed by a server based at least in part on a user profile associated with a user interface correlated to a content platform;
    retrieving metadata for each of the plurality of content items;
    generating, based on a plurality of voice command templates, one or more candidate voice commands, wherein each candidate voice command comprises a verb and metadata corresponding to a content item of the plurality of content items;
    generating, for each candidate voice command, a respective recall score based at least in part on a number of matching phonetic features in a respective candidate voice command;
    selecting a candidate voice command based on recall scores of the one or more candidate voice commands; and
    generating for output the selected candidate voice command on the user interface of a computing device that is correlated to the content platform.

2. The method of claim 1, wherein the generating the one or more candidate voice commands comprises:
identifying, for each of the plurality of voice command templates, one or more metadata types required to complete each of the plurality of voice command templates; and
determining a respective metadata type for the retrieved metadata for each of the plurality of content items.

3. The method of claim 2, further comprising:
comparing each respective one or more metadata types to each of the respective metadata types of the retrieved metadata;
determining, based on the comparing, which of the plurality of voice command templates can be completed using the retrieved metadata; and
identifying, based on which of the plurality of voice command templates can be completed, a subset of metadata corresponding to the content item of the plurality of content items.

4. The method of claim 1, wherein the generating the respective recall score based at least in part on the number of matching phonetic features in a respective candidate voice command comprises:
identifying a first phonetic feature in a first clause of a candidate voice command, wherein the first clause comprises the verb; and
identifying a second phonetic feature of a second clause of the candidate voice command, wherein the second clause comprises a dependent clause.

5. The method of claim 4, further comprising:
comparing the first phonetic feature to the second phonetic feature;
assigning, based on the comparing, a similarity value to the candidate voice command, and calculating, based on the similarity value, a respective recall score.

6. The method of claim 4, wherein at least one of the first phonetic feature or second phonetic feature comprises a phoneme.

7. The method of claim 5, further comprising:
comparing the respective recall score to a threshold recall score;
determining, based on the comparing, the respective recall is less than the threshold recall score;
in response to determining the respective recall score is less than the threshold recall score, retrieving a plurality of filler words;
selecting, from the plurality of filler words, a filler word to modify the candidate voice command to enable a match of a phoneme of the first phonetic feature to a phoneme of the second phonetic feature; and
modifying the candidate voice command with the selected filler word.

8. The method of claim 7, further comprising:
identifying, based on where the selected filler word is placed in the candidate voice command, either a revised first phonetic feature or a revised second phonetic feature of the candidate voice command;
comparing either the revised first phonetic feature to the second phonetic feature or the first phonetic feature to the revised second phonetic feature;
assigning, based on the comparing, a revised similarity value to the candidate voice command modified with the selected filler word; and
calculating, based on the similarity value, a revised respective recall score.

9. The method of claim 1, wherein generating, for each candidate voice command, the respective recall score comprises:
identifying, for each respective candidate voice command, at least one respective first phonetic feature in each respective first clause of each respective candidate voice command, wherein each respective first clause comprises the verb and wherein each respective first phonetic feature comprises a first phonetic feature type;
identifying, for each respective candidate voice command, at least one respective second phonetic feature in each respective second clause of the candidate voice command, wherein each respective second clause comprises a respective dependent clause and wherein each respective second phonetic feature comprises a second phonetic feature type; and
identifying a respective value for modifying a recall score of a respective candidate voice command when a first phonetic feature type matches a second phonetic feature type.

10. The method of claim 9, further comprising:
comparing each respective first phonetic feature type to each respective second phonetic feature type; and
in response to determining, based on the comparing, that a respective first phonetic feature type matches the second phonetic feature type, modifying a recall score, corresponding to a respective candidate voice command that comprises a first phonetic feature type that matches a second phonetic feature type, based on a respective value retrieved from memory.

11. The method of claim 1, wherein the generating the respective recall score based at least in part on the number of matching phonetic features in a respective candidate voice command comprises:
determining a first number of syllables in a first clause of a candidate voice command;
determining a first rate of speech corresponding to the first number of syllables;
determining a second number of syllables in a second clause of the candidate voice command;
determining a second rate of speech corresponding to the second number of syllables; and
comparing the first number of syllables to the second number of syllables, and the first rate of speech to the second rate of speech.

12. The method of claim 11, further comprising:
in response to determining the first number of syllables matches the second number of syllables, increasing the respective recall score by a first scalar value; and
in response to determining the first rate of speech matches the second rate of speech, increasing the respective recall score by a second scalar value.

13. The method of claim 1, wherein the generating the respective recall score based at least in part on the number of matching phonetic features in a respective candidate voice command comprises:
identifying a first phoneme in a first clause of a candidate voice command;
identifying a second phoneme in a second clause of the candidate voice command;
determining, based on a first position of the first phoneme in the first clause and a second position of the second phoneme in the second clause, the candidate voice command comprises a rhyme between the first clause and the second clause; and
increasing the respective recall score by a scalar value.

14. The method of claim 1, further comprising:
receiving an input query;
identifying, based on the query, a subset of the plurality of voice command templates, wherein each of the subset of the plurality of voice command templates comprises a verb from the user query or a verb related to the verb from the user query; and
generating, based on the subset of the plurality of voice command templates, a subset of candidate voice commands.

15. The method of claim 14, further comprising:
generating, for each of the subset of the plurality of candidate voice commands, a respective recall score based at least in part on a number of matching phonetic features in a respective candidate voice command;
selecting, from the subset of the plurality of candidate voice commands, one or more candidate voice commands, wherein each candidate voice command of the list of candidate voice commands has a respective recall score that exceeds a threshold recall score; and
generating the list of candidate voice commands for output such that the list of candidate voice commands can be perceived simultaneously with the user query.

16. The method of claim 1, further comprising:
receiving an input corresponding to a command;
identifying, based on the input, one or more terms associated with the command;
comparing the one or more terms associated with the command to the plurality of voice command templates, wherein each of the plurality of voice command templates comprises one or more respective terms;
identifying one or more of the plurality of voice command templates that are comprised of terms within a similarity threshold of the one or more terms associated with the command; and
in response to identifying the one or more of the plurality of voice command templates, replacing the terms that are within the similarity threshold of the one or more terms associated with the command with a respective term of the plurality of terms associated with the command.

17. The method of claim 1, wherein selecting the candidate voice command based on the recall score comprises:
determining one of the respective recall scores corresponds to a respective value that is higher than values corresponding to the other respective recall scores; and
selecting the candidate voice command that corresponds to the highest value.

18. A system for suggesting voice-based commands to a user, the system comprising:
processing circuitry configured to execute instructions to:
identify a plurality of content items available for consumption, wherein the identification is based on a search performed by a server based at least in part on a user profile associated with a user interface correlated to a content platform;
retrieve metadata for each of the plurality of content items; and
control circuitry configured to execute instructions to:
generate, based on a plurality of voice command templates, one or more candidate voice commands, wherein each candidate voice command comprises a verb and metadata corresponding to a content item of the plurality of content items;
generate, for each candidate voice command, a respective recall score based at least in part on a number of matching phonetic features in a respective candidate voice command;
select a candidate voice command based on recall scores of the one or more candidate voice commands; and
generate for output the selected candidate voice command on the user interface of a computing device that is correlated to the content platform.

19. The system of claim 18, wherein the control circuitry configured to generate the one or more candidate voice commands is further configured to:
identify, for each of the plurality of voice command templates, one or more metadata types required to complete each of the plurality of voice command templates; and
determine a respective metadata type for the retrieved metadata for each of the plurality of content items.

20. The method of claim 1, further comprising, updating, by the server, the plurality of voice command templates, wherein the updating is based on data correlating a user's utilization of previously suggested voice commands to the user's retention of a format of the previously suggested voice commands.

* * * * *